United States Patent
Goder et al.

(10) Patent No.: US 7,696,912 B2
(45) Date of Patent: Apr. 13, 2010

(54) INTERRUPT BASED MULTIPLEXED CURRENT LIMIT CIRCUIT

(75) Inventors: Dimitry Goder, San Jose, CA (US); Zongqi Hu, Milpitas, CA (US); Kendra Nguyen, San Jose, CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 12/114,693

(22) Filed: May 2, 2008

(65) Prior Publication Data

US 2009/0273498 A1    Nov. 5, 2009

(51) Int. Cl.
    *H03M 1/00*    (2006.01)
(52) U.S. Cl. .................... 341/142; 341/155
(58) Field of Classification Search .......... 341/142, 341/144, 118, 120, 141
    See application file for complete search history.

(56) References Cited

U.S. PATENT DOCUMENTS

| | | | | |
|---|---|---|---|---|
| 4,128,771 | A * | 12/1978 | Domenico | 307/52 |
| 7,417,406 | B2 * | 8/2008 | Miwa et al. | 320/151 |
| 7,518,350 | B2 * | 4/2009 | Leung | 323/283 |
| 2008/0246445 | A1 * | 10/2008 | Wrathall | 323/207 |

OTHER PUBLICATIONS

International Search Report of the International Searching Authority for Application No. PCT/US2009/042369, mailed on Jun. 1, 2009, 2 pages.
Written Opinion of the International Searching Authority for Application No. PCT/US2009/042369, mailed on Jun. 1, 2009, 4 pages.

* cited by examiner

*Primary Examiner*—Peguy JeanPierre
(74) *Attorney, Agent, or Firm*—Townsend and Townsend and Crew LLP

(57) ABSTRACT

A switching voltage regulator includes, in part, N output stages, a loop ADC, a multiplexer, a current ADC, and an interrupt block. The loop analog-to-digital converter receives the N output voltages each of which is associated with one of N channels. The loop ADC is adapted to vary a duty cycle of N signals each applied to one of the N output stages that generate the N output voltages. The interrupt block is adapted to enable the multiplexer to couple an output stage to the current ADC if a difference between voltages sensed at an output stage during at least two sampling times exceeds a predefined threshold value. The interrupt block may also be adapted to enable the multiplexer to couple an output stage to the current ADC block if a difference between a voltage sensed at the output stage and a reference voltage exceeds a predefined threshold value.

13 Claims, 4 Drawing Sheets

INTERRUPT BASED MULTIPLEXED CURRENT LIMIT CIRCUIT

BACKGROUND OF THE INVENTION

The present invention relates to integrated circuits, and more particularly to protecting a switching voltage regulator from overshoot conditions.

Switching voltage regulator power supplies are well known and commonly used to generate a regulated output voltage from a higher DC supply voltage that is relatively unstable and noisy. FIG. 1 is a schematic block diagram of a step-down voltage regulator 100, as known in the prior art. Power stage 102 includes MOS transistors 104 and 106 that are alternately switched on and off thereby to generate a square wave signal filtered by the LC network 108. The output voltage signal Vout of LC network 108 is the regulated output voltage of voltage regulator 100.

The level of the output voltage Vout is controlled by varying the duty cycle of the signals applied to MOS transistors 104 and 106. To maintain voltage regulation, the output voltage Vout is fed back to analog-to-digital (ADC) control loop 112 where it is digitized and applied as an input signal to digital compensator 114. Digital compensator 112 is adapted to regulate the output voltage Vout by varying the duty cycle of the signals generated by pulse-width modulated generator block 114.

Switching voltage regulators often include over-current protection circuitry adapted to protect the output voltage during overload conditions which may cause the output current to overshoot. To protect against current overshoots, the output current Iout is sensed and delivered to an over-current protection circuitry. FIG. 1 shows a simplified current sensor 120 coupled to current sensing ADC 118. Under overload or short circuit condition, output current Iout increases beyond a predefined maximum level. Current sensing ADC 118 is adapted to detect if this predefined current level is exceeded and in response causes the duty cycle of the signals applied to power stage 102 to vary so as to limit output current Iout.

In order to prevent destructive overload, output current Iout is required to be limited very quickly. Under severe overload, such as a short circuit, output current increases quickly and can reach destructive levels in several switching cycles. For example, a buck regulator designed to deliver 10A of output current may produce as high as 30A of current during a few switching cycles. In order to prevent such destructions, a fast current limit circuit is required.

Conventional circuits are adapted to sense the output current once per switching cycle. FIG. 2 is a schematic diagram of a number of blocks disposed in a conventional switching voltage regulator. These blocks include a power stage 202, a current ADC 204, an over-current protection block 206, a compensator 208, and a loop ADC 210. Loop ADC 210 is shown as sensing the output voltage Vout of the switching voltage regulator (hereinafter alternatively referred to as regulator). Current ADC 204 is shown as controlling over-current protection block 206 in response to the output current Iout sensed using power stage block 202. The output signals of both over current protection block 206 and Loop ADC 210 are applied to compensator 208.

In order to sense the output current, a sensor is used. The current may be sensed by measuring a voltage drop across a current sense transformer or a current sense resistor. Alternatively, the current can be sensed as a voltage drop across the MOS transistors disposed in the power stage or the inductor. Over-current protection block 206 is adapted to protect the MOS transistors (switches) disposed in power stage 202 by turning them off once the maximum allowable current is exceeded. It is desired to sample the output current level frequently in order to ensure quick reaction in response to an overload condition.

It is commonly desirable to provide multiple voltage supplies. To achieve this, a multi-channel regulator may be used. In a multi-channel regulator, each output current is sensed independently in order to protect the multitude of output stages. FIG. 3 is a block diagram of the current sensing feedback circuitry 300 of a multi-channel regulator (not shown) adapted to protect against current over-shoots. Feedback circuitry 300 is shown as including N-channels, namely channels, $302_1, 302_2 \ldots 301_N$ with each channel including a current ADC $304_i$ coupled to an associated power stage block $306_i$, where i is an index ranging from 1 to N. As is seen from FIG. 3, the output current of each channel $302_i$ is sensed separately and digitized by an associated digital-to-analog converter $304_i$. A multi-channel regulator with a current feedback circuit such as that shown in FIG. 3 is not scalable. Since each channel has a dedicated current ADC, increasing the number of channels would require a corresponding increase in the number of ADCs.

FIG. 4 is a block diagram of the current sensing feedback circuitry 400 of a multi-channel regulator (not shown) adapted to protect against current over-shoots. Feedback circuitry 400 is shown as including an over current protection block 408, a current ADC 404 and a multiplexer 402 adapted to couple one of the power stages $406_i$ to ADC 404. The output current in each channel is separately sensed and sequentially applied to ADC 404 using multiplexer 402. In other words, multiplexer 402 sequentially supplies the output current sensed from one of the output channels to ADC 404.

Since a multiplexer often has a much smaller physical size than an ADC, feedback circuit 400 of FIG. 4 overcomes the size limitations of feedback circuit 300 of FIG. 3. However in feedback circuit 400, the output signal is sampled once per switching cycle and each channel is digitized once every N cycles, where N is the total number of channels. This causes an N-cycle delay for each channel and is thus undesirable. One technique to overcome this problem is to include a relatively fast ADC adapted to digitize analog current signal in a fraction of the switching cycle period in order to be able to digitize the output currents from all the channels in one switching cycle. Including such an ADC would add to the complexity of the design, and increase the die size as well as the current consumption.

BRIEF SUMMARY OF THE INVENTION

In accordance with one embodiment of the present invention, a switching voltage regulator includes, in part, N output stages, a loop analog-to-digital converter, a multiplexer, a current ADC block, and an interrupt block. The loop analog-to-digital converter is adapted to receive the N output voltages each of which is associated with one of the N channels. The loop ADC block is adapted to vary a duty cycle of N signals each applied to a different one of the N the output stages that generate the N output voltages. The multiplexer is responsive to the N output stages. The current ADC block is responsive to the multiplexer. The interrupt block is responsive to the loop ADC block and is adapted to enable the multiplexer to couple one of the output stages to the current ADC block.

In one embodiment, the switching voltage regulator further includes, in part, N compensation blocks coupled to the loop ADC block. Each compensation block is responsive to one of the output stages and is adapted to vary the width of the pulse applied to the output stage associated with that compensation block. In one embodiment, the switching voltage regulator further includes N pulse-width modulation blocks each coupled to one of N the compensation blocks. An overcurrent protection block disposed in the switching voltage regulator is responsive to the current ADC.

In one embodiment, the loop ADC block includes N loop ADC blocks each responsive to one of the output stages. In one embodiment, the interrupt block is adapted to enable the multiplexer to couple an output stage to the current ADC block if a difference between voltages sensed at the output stage during at least two sampling times exceeds a predefined threshold value. In another embodiment, the interrupt block is adapted to enable the multiplexer to couple an output stage to the current ADC block if a difference between a voltage sensed at the output stage and a reference voltage exceeds a predefined threshold value.

In accordance with one embodiment of the present invention, a method of regulating N output voltages of a switching voltage regulator includes, in part, receiving the N output voltages each of which is associated with a one of N channels; converting the received N voltages to N digital output voltage signals; issuing an interrupt signal in response to one of the N digital output voltage signals, and selectively sensing one of N currents supplied by the N output stages in accordance with the issued interrupt signal signals.

In one embodiment, the method further includes varying the pulse widths of N input signals each applied to the N output stages. The method further includes converting the current supplied by the selected output stage to a digital current signal. The method further includes using the digital current signal to turn off one or more devices disposed in the selected output stage. In one embodiment, the method further includes issuing an interrupt signal associated with one of the N channels if a difference between voltages sensed at the associated output stage during at least two sampling times exceeds a predefined threshold value. In another embodiment, the method further includes issuing an interrupt signal associated with one of the N channels if a difference between a voltage sensed at the associated output stage and a reference voltage exceeds a predefined threshold value.

DETAILED DESCRIPTION OF THE INVENTION

Figure 1:
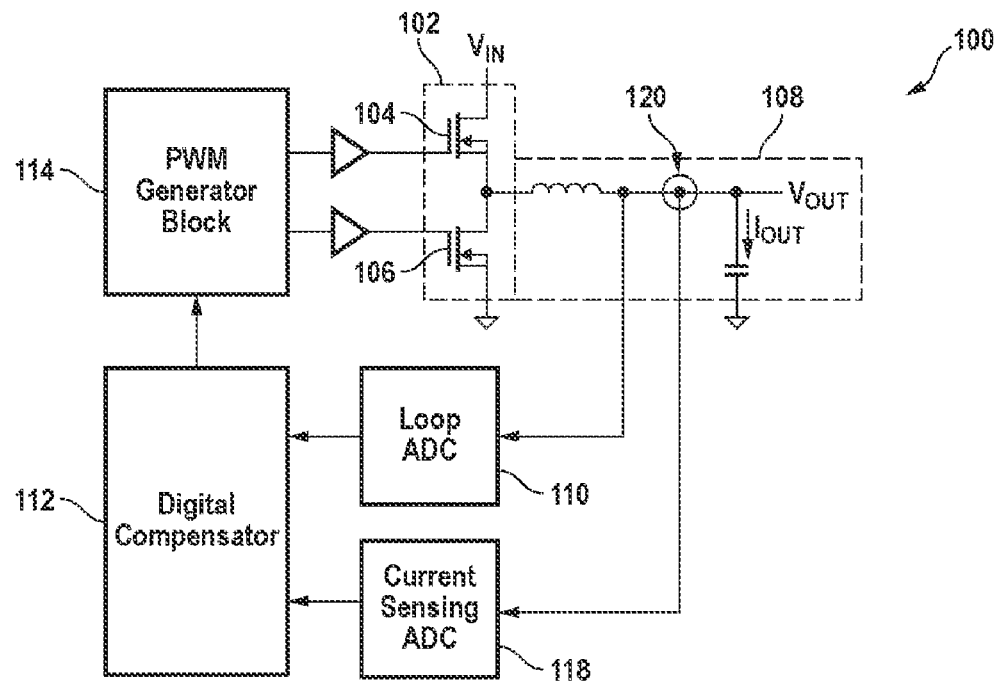
FIG. 1 is a schematic block diagram of a step-down voltage regulator, as known in the prior art.
Figure 2:
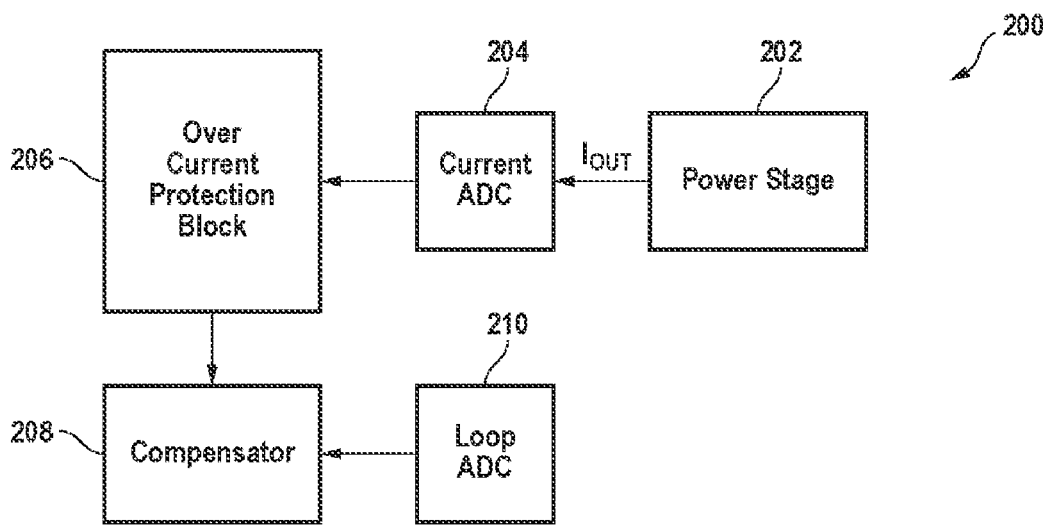
FIG. 2 is a schematic diagram of a number of blocks disposed in a switching voltage regulator, as known in the prior art.
Figure 3:
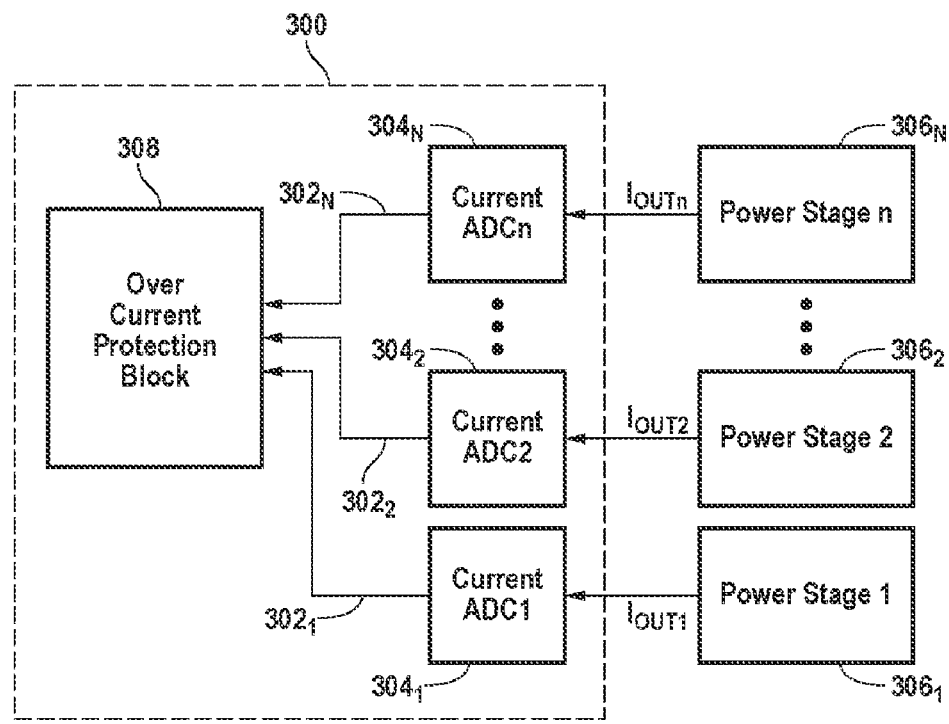
FIG. 3 is a block diagram of the current sensing feedback circuitry of a multi-channel regulator, as known in the prior art.
Figure 4:
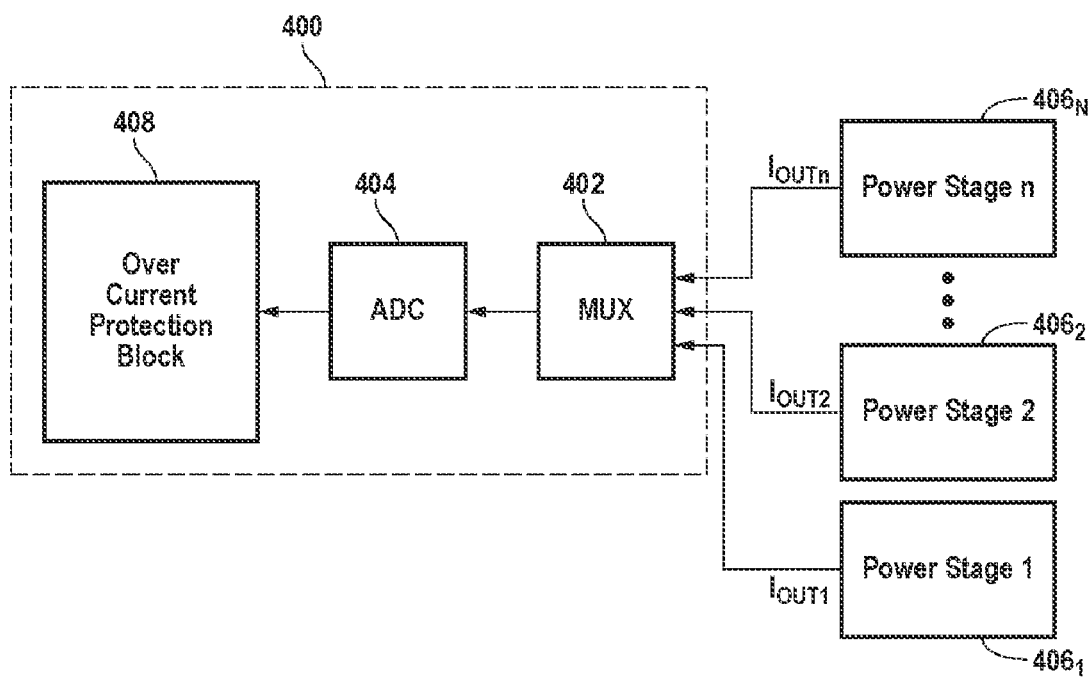
FIG. 4 is a block diagram of the current sensing feedback circuitry of a multi-channel regulator, as known in the prior art.
Figure 5:
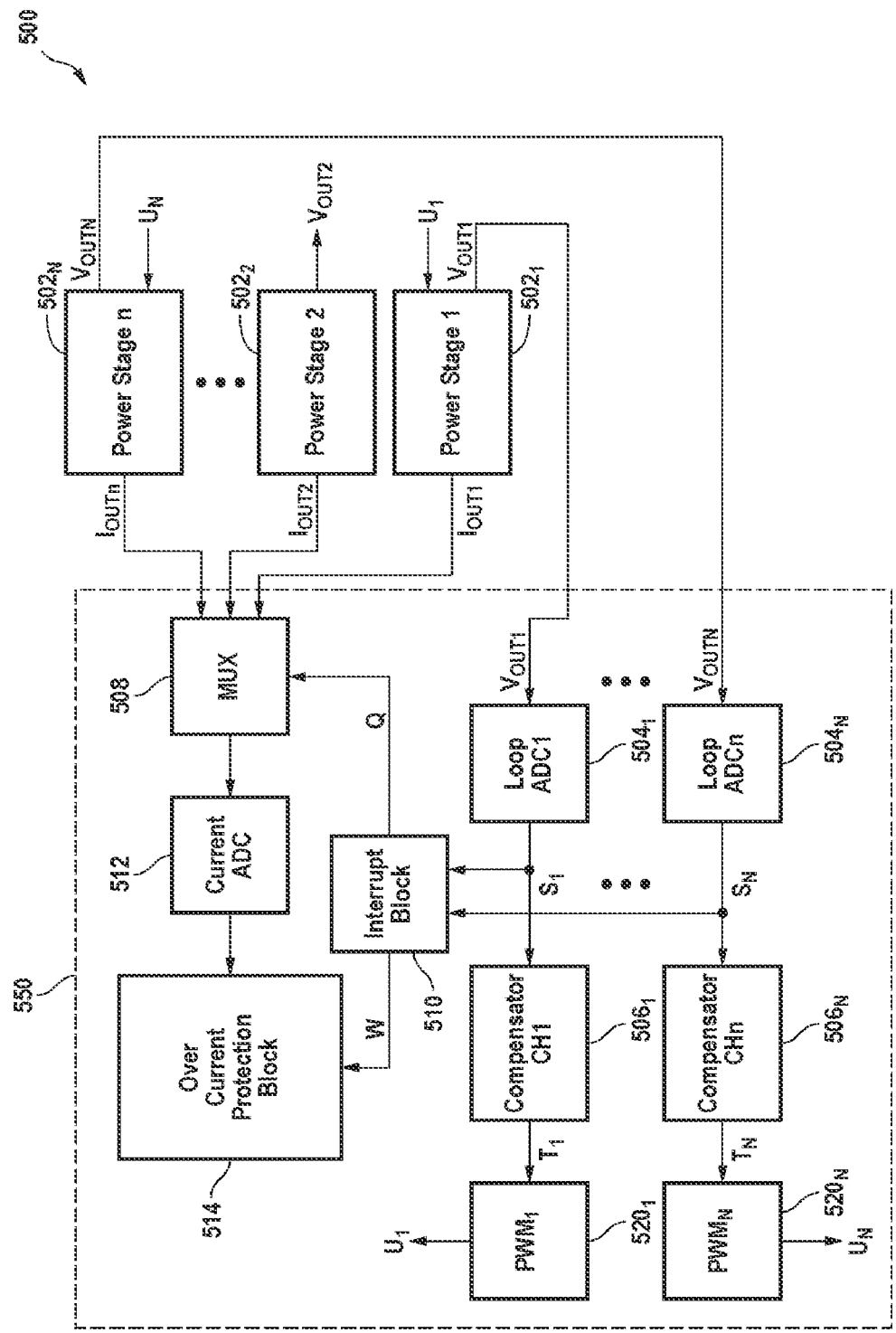
FIG. 5 is a block diagram of a multi-channel voltage regulator, in accordance with one embodiment of the present invention.

FIG. 5 is a block diagram of a multi-channel voltage regulator 500, in accordance with one embodiment of the present invention. Multi-channel voltage regulator 500 is shown as including N power stages (alternatively referred to as output stages) $502_1$, $502_2$ ... $502_N$ and a feedback circuit 550. Feedback circuit 550 is shown as including N loop analog-to-digital converters (ADC), namely ADCs $504_1$, $504_2$ ... $504_N$, N compensators, namely compensators $506_1$, $506_2$ ... $506_N$, an interrupt block 510, a multiplexer 508, a current ADC 512, and an over-current protection block 514.

The output voltage $Vout_i$, where i is an index ranging from 1 to N, from channel i is supplied to an associated loop ADC $504_i$. For example, output voltage $Vout_1$ is coupled to loop DC $504_1$, output voltage $Vout_N$ is coupled to loop DC $504_N$, etc. The output signal $S_i$ from loop ADC $504_i$ is delivered to an associated compensator $506_i$. For example, signal $S_1$ generated by loop ADC $504_1$ is delivered to compensator $506_1$, signal $S_N$ generated by loop ADC $504_N$ is delivered to compensator $506_N$, etc. The signal generated by each compensator $T_i$ is delivered to an associated PWM block $520_i$. For example, signal $T_1$ generated by loop compensator $506_1$ is delivered to PWM block $520_1$, signal $T_N$ generated by loop ADC $506_N$ is delivered to PWM block $520_N$, etc. Signal $U_1$ generated by PWM $520_i$ is delivered to power stage block $502_i$. For example, signal $U_1$ generated by PWM block $520_1$ is delivered to power stage $502_1$, signal $U_N$ generated by PWM block $520_N$ is delivered to power stage $502_N$, etc.

The output voltage $Vout_i$ of each channel is fed back to the associated ADC block $504_i$ and compensator $506_i$ to be regulated by varying the duty cycle of the signal generated by the associated pulse-width modulated block $520_1$. Signals $S_1$ ... $S_N$ generated by loop ADCs $502_1$ ... $502_N$ are applied to the interrupt block 510. Although not shown, in some embodiments, a single loop ADC 504 may be used in place of the N ADC loops $504_1$ ... $504_N$ (alternatively and collectively identified using reference numeral 504). In such embodiments, the output voltages $Vout_1$ ... $Vout_N$ are multiplexed and subsequently applied to the single ADC loop 504.

As seen from FIG. 5, current signals $Iout_1$, $Iout_2$ ... $Iout_N$ are applied to the data input terminals of multiplexer 508. Multiplexer 508 is adapted to sequentially, i.e. during each given time slot, couple one of these channels to the input terminal of current ADC 512. ADC 512 is thus adapted to sample and convert the current level in each channel once per N cycles, where N is total number of channels disposed in voltage regulator 500. The output signals $S_1$ ... $S_N$ of loop ADCs 504 are also applied to interrupt block 510. Interrupt block 510 is adapted to determine whether a current transient is sensed at any of the output nodes of regulator 500. When the voltage level of any of the signals $S_1$ ... $S_N$, respectively corresponding to channels 1 through N, is detected as falling below a predetermined level, the output signal Q of interrupt block 510 is varied so as to select that channel via multiplexer 508. The selected channel is thus coupled to current ADC 512 to sense the output current associated with that channel.

There may be instances where it would be too late for over-current protection block 514 to wait for a response from current ADC 512 to trigger over-current protection. In such instances, over current protection block 514 issues a protection signal based on the input of the interrupt block 510. For example, assume that interrupt block 510 detects a relatively large voltage drop indicative of a nearly shorted output to ground of one of the channels. In such a condition, the delay for the corresponding signal to propagate though mux 508 may be too long. To remedy this, interrupt block 510 issues signal W to over-current protection block 514 to turn off the channel current as soon as possible.

Over-current protection block 514 is adapted to sense the digitized value of the current it receives from current ADC 512 and limit the associated output current if required. For example, assume that interrupt block 510 detects that signal voltage $S_1$ is less than a threshold value. Accordingly, interrupt block 510 causes signal Q to select power stage $502_1$ to be coupled to current ADC 512 via multiplexer 508. Similarly, assume that interrupt block 510 detects that signal voltage $S_N$ is less than a threshold value. Accordingly, interrupt block 510 causes signal Q to select power stage $502_N$ to be coupled to current ADC 512 via multiplexer 508.

In one embodiment, interrupt block 510 is adapted to compare the value of channel i's ADC output voltage at sampling time m ($VOUTi_m$) to the previous value measured at sampling time m−1 ($VOUTi_{m-1}$). Under a steady state condition, the difference between such two measurements is relatively very small since the output voltage does not ordinarily change much. When the output current is suddenly increased, output voltage at sampling time m is reduced substantially. When the difference between $VOUTi_{m-1}$ and $VOUTi_m$ exceeds a predetermined threshold, an associated interrupt signal is issued. In other words, an Interrupt signal is issued when the following condition is met:

$$VOUTi_{m-1} - VOUTi_m > V_{THRESHOLD}$$

In accordance with another embodiment, channel i's ADC output voltage at sampling time m is compared with a reference voltage. Regulation error voltage is defined as the difference between the reference voltage VREFi and the measured voltage. Under steady state conditions, the associated loop regulates the output voltage to be equal to the reference value, thereby causing the error voltage to be equal to nearly zero. A sudden increase in an output current causes the associated output voltage to drop, which in turn, causes a relatively large error value to be sampled. When this error value exceeds a predefined threshold value, an Interrupt signal is issued, in accordance with the following expression:

$$VREFi - VOUTi_m > V_{THRESHOLD}$$

Upon asserting the interrupt signal, the predefined sequence of the current sampling by current ADC 512 is aborted. Multiplexer 508 is then caused to couple the power stage $502_i$—in which the sudden voltage transient is detected—to current ADC 512 to enable measurement of the current in the associated channel i. This ensures only one cycle delay in detection of the over-current condition regardless of the number of multiplexed channels while benefiting from the advantage of using a single, multiplexed current sampling ADC.

Figure 6:
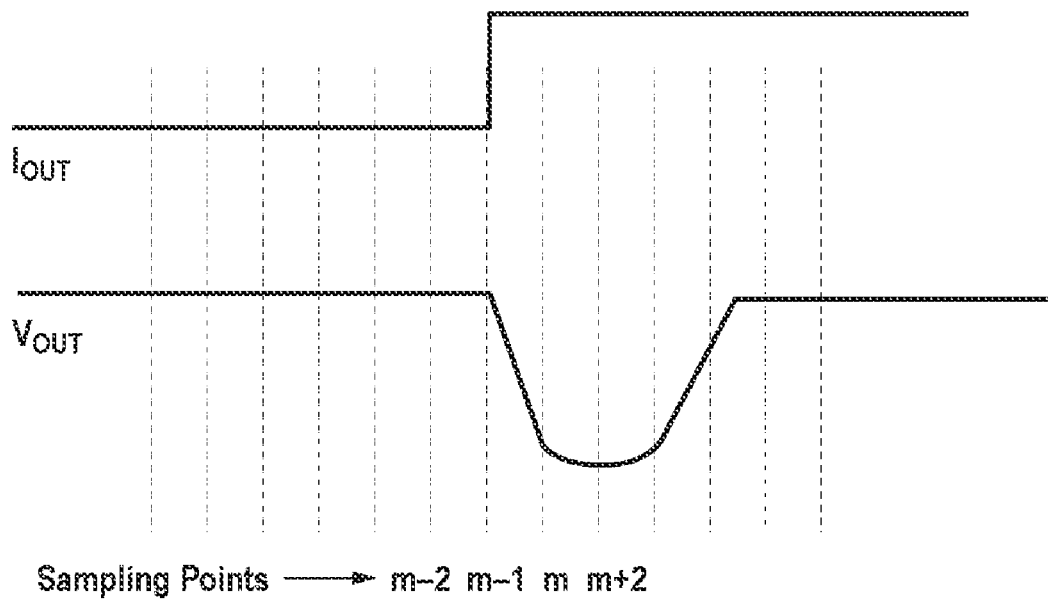
FIG. 6 is an exemplary timing diagram associated with the multi-channel voltage regulator, in accordance with one embodiment of the present invention.
Figure 6:
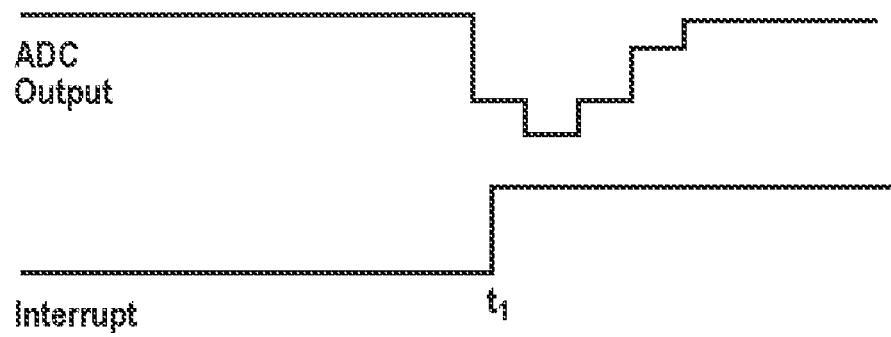

FIG. 6 is an exemplary timing diagram of signals associated with multi-channel switching voltage regulator 500. Voltage Vout associated with one of the channels is shown as being sampled at discrete times, e.g., sampling times (m−n) . . . (m−2), (m−1), (m), (m+1), and (m+2) . . . (m+n). The difference between the sampled output voltages at times (m) and (m−1) as generated by the loop ADC is assumed to be greater than the predefined threshold value. Accordingly, signal Interrupt is asserted at time $T_1$ to enable the current Iout in the channel in which the voltage drop is detected to be coupled to the current ADC, as described above.

The above embodiments of the present invention are illustrative and not limiting. Various alternatives and equivalents are possible. The invention is not limited by the type of switch, PWM modulator, etc. that may be used to regulate an output voltage. The invention is not limited by the type of device or integrated circuit in which the present disclosure may be disposed. Nor is the disclosure limited to any specific type of process technology, e.g., CMOS, Bipolar, or BICMOS that may be used to manufacture the present disclosure. Other additions, subtractions or modifications are obvious in view of the present disclosure and are intended to fall within the scope of the appended claims.

What is claimed is:

1. A switching voltage regulator comprising:
a loop analog-to-digital converter (ADC) block adapted to receive N output voltages each associated with a different one of N channels, said loop ADC block adapted to vary a duty cycle of one of N signals each applied to a different one of N output stages generating the N output voltages;
a multiplexer responsive to the N output stages;
a current ADC block responsive to the multiplexer; and
an interrupt block responsive to the loop ADC block and adapted to enable the multiplexer to couple one of the output stages to the current ADC block.

2. The switching voltage regulator of claim 1 further comprising:
N compensation blocks coupled to the loop ADC block and each being responsive to a different one of the output stages, each compensation block being adapted to cause a change in a width of a pulse applied to an associated output stage.

3. The switching voltage regulator of claim 2 further comprising:
N pulse-width modulation block each coupled to a different one of N compensation blocks.

4. The switching voltage regulator of claim 3 further comprising:
an over current protection block responsive to the current ADC.

5. The switching voltage regulator of claim 1 wherein said loop ADC block comprises N loop ADC blocks each being responsive to a difference one of the output stages.

6. The switching voltage regulator of claim 1 wherein said interrupt block is adapted to enable the multiplexer to couple an output stage to the current ADC block if a difference between voltages sensed at the output stage during at least two sampling times exceeds a predefined threshold value.

7. The switching voltage regulator of claim 1 wherein said interrupt block is adapted to enable the multiplexer to couple an output stage to the current ADC block if a difference between a voltage sensed at the output stage and a reference voltage exceeds a predefined threshold value.

8. A method of regulating N output voltages of a switching voltage regulator, the method comprising:
receiving the N output voltages each associated with a different one of N output stages;
generating N currents each generated by a different one of the N output stages;
converting the received N voltages to N digital output voltage signals;
issuing an interrupt signal in response to one of the N digital output voltage signals; and
selectively sensing one of the N currents supplied by the N output stages in accordance with the issued interrupt signal.

9. The method of claim 8 further comprising:
applying N input signals the N output stages; each output stage receiving a different one of the N input signals and varying a pulse width of one of N input signals.

10. The method of claim 9 further comprising:
converting the current supplied by the selected output stage to a digital current signal.

11. The method of claim 10 further comprising:
using the digital current signal to turn off one or more devices disposed in the selected output stage.

12. The method of claim 8 wherein an interrupt signal associated with one of the N channels is issued if a difference between voltages sensed at the associated output stage during at least two sampling times exceeds a predefined threshold value.

13. The method of claim 8 wherein an interrupt signal associated with one of the N channels is issued if a difference between a voltage sensed at the associated output stage and a reference voltage exceeds a predefined threshold value.

* * * * *